United States Patent [19]

Lipert

[11] 4,356,131

[45] Oct. 26, 1982

[54] CIRCULATING DEVICE FOR LIQUIDS CONTAINING LONG-CHAIN MOLECULES

[75] Inventor: Peter Lipert, Dollard Des Ormeaux, Canada

[73] Assignee: Atara Corporation, Dorval, Canada

[21] Appl. No.: 229,679

[22] Filed: Jan. 29, 1981

[51] Int. Cl.³ .............................................. B01F 3/04
[52] U.S. Cl. .................................... 261/77; 137/209; 261/123; 210/220
[58] Field of Search ................. 137/209, 154; 261/77, 261/36 R, 119 R, 120, 121 R, DIG. 75; 210/220

[56] References Cited

U.S. PATENT DOCUMENTS

| | | | |
|---|---|---|---|
| 3,246,761 | 4/1966 | Bryan | 261/77 X |
| 3,592,450 | 7/1971 | Rippon | 261/121 R X |
| 4,169,873 | 10/1979 | Lipert | 261/77 X |
| 4,187,263 | 2/1980 | Lipert | 261/77 |

Primary Examiner—Alan Cohan
Attorney, Agent, or Firm—McAulay, Fields, Fisher, Goldstein & Nissen

[57] ABSTRACT

An apparatus is provided for causing circulation within a large body of fluid, especially a fluid comprising long molecules, such as polymer chains. The apparatus comprises a so-called "large bubble" generator, which generates a gas bubble to push the liquid through a series of bent pipes and ultimately into a vertically extending stackpipe. Upon generating a large gas bubble into the stackpipe, the gas acts as a piston within the stackpipe, pushing liquid upwardly therethrough, and thereby drawing liquid into the bottom. In order to prevent "motoring", a sharp-edged baffle plate is provided at a bend in the pipes between the gas-accumulator and the stackpipe. The baffle plate serves to prevent continuing flow of the fluid created by the presence of the long chain molecules.

9 Claims, 5 Drawing Figures

CIRCULATING DEVICE FOR LIQUIDS CONTAINING LONG-CHAIN MOLECULES

The present invention relates generally to improvements in circulating devices for large standing bodies of liquids, and more particularly related to an improved "large bubble" generating system.

There are many procedures that require the maintenance and agitation of standing bodies of liquid, and the concurrent heating or cooling to control the temperature of such bodies of liquids. The presence of a solid phase within the liquid generally necessitates a continuing agitation of the liquid in order to more uniformly suspend the solid within the body of liquid, and simultaneously to maintain a substantially uniform optimum temperature throughout the liquid. Such requirements are often met, inter alia, in sewage digestion systems, and most especially in anaerobic sewage systems where violent agitation in the atmosphere is not possible. Because of the nature of the solids often encountered in such systems, it is desirable that moving mechanical parts be avoided in direct contact with the body of liquid of the solids dispersed therein. Similarly, in the mixing of sensitive liquids, or of a solid into a liquid suspension, a nonmechanical, continuous mixing means is often required to insure mixing throughout the body of liquid, while avoiding excessively vigorous, and thus potentially damaging, agitation at a specific location. Reliability, ease of servicing and maintenance, and the avoidance of any interference with the biological or chemical process being carried on in the liquid are of paramount importance.

Large bubble generators have often been used for a variety of purposes, as is shown, for example, in U.S. Pat. No. 3,592,450 to Rippon, U.S. Pat. No. 3,628,775 to McConnell, and U.S. Pat. No. 3,246,761 to Bryan et al. Many of these devices include gas bubble generators comprising a gas accumulator tank and an inverted siphon connecting the accumulator tank to a vertically rising stackpipe. See also applications Ser. No. 749,670, filed Dec. 13, 1976, by Lipert, and now U.S. Pat. No. 4,169,873, and Ser. No. 3,707, filed Jan. 15, 1979, and now U.S. Pat. No. 4,187,263, and copending application Ser. No. 54,826, filed July 5, 1979.

Operation of these large bubble generators provides for the continuous flow of gas into a submerged gas accumulator chamber, which is connected by an inverted siphon to a substantially vertical stackpipe. Intermittent generation of large gas bubbles is obtained when the gas level in the accumulator tank extends down to a pipe bend leading to the upwardly extending leg of the siphon. The gas is rapidly discharged into the upward leg as a single large bubble, the liquid refilling the accumulator behind the bubble.

The standard large-bubble generators, as described generally above, have been found to be less than wholly successful where a material to be mixed is formed of long, chain-like molecules. The generation of the large bubble is interrupted at relatively low gas flow rates by a phenomenon known as "motoring", i.e., a continuous stream of small bubbles in liquid are generated; this does not provide the required "piston" effect in the stackpipe. It should be understood that "motoring" is expected to occur in any liquid, even pure water, if the gas flow reaches a certain threshold level. However, the presence of such long, chain-like molecules appears to lower the threshold gas flow rate at which "motoring" begins. It is believed that the long chain molecules continue to be pulled through the generator piping, by the preceding fluid, even without the pressure effect of the gas in the generator. Although this apparatus is not dependent for its operation on any particular theory, one explanation for the effect of the long chain molecules that creates this problem is set forth in an article entitled "Serious Fun With Polyox, Silly Putty, Slime and Other Non-Newtonian Fluids," by Jearl Walker, in *Scientific American*, Vol. 239, No. 5, pps. 186–196, (November . 1978).

In accordance with the present invention, the interference with the proper operation of a large-bubble gas generator by the long chain molecules is limited by providing a sharp-edged baffle at the bend leading to the upwardly extending siphon leg, i.e, the surface defining the discharge level of the gas from the accumulator tank. Preferably, each pipe bend between the accumulator tank and the stack pipe includes such a sharp edge.

Although this invention provides the desired improvement for any design of gas bubble generator of the type herein set forth, it shall hereinafter be exemplified by the design shown in the accompanying drawings.

The sharp-edged baffle useful in accordance with the present invention comprises a thin plate extending into the fluid flow path at the pipe bend. Preferably the thin plate extends from the inner portion of the bend, most preferably from about the apex of the bend. Also, most preferably, the thin baffle plate blocks at least about 10% of the interior cross-section, i.e., area of fluid flow, of the pipe, and up to about 80% of the area. Optimally, the thin plate does not block more than 50% of such cross-sectional area.

The sharp edge of the thin plate should define a line in a plane extending transverse to the direction of fluid flow in the pipe. The line should preferably be perpendicular to the direction of fluid flow. The line can be a straight line, several straight lines, a curved line, or several curved lines, or any combination thereof. If more than one line is formed, i.e., several discontinuous sharp edges are present, the lines preferably intersect.

The baffle surface of the plate, i.e., facing into the flowing fluid, should preferably be substantially flat; most preferably, the plane of the baffle surface contains an interior diameter of the pipe extending from the inner apex of the pipe bend, and the baffle surface is also preferably substantially perpendicular to the direction of fluid flow.

The thin plate can also comprise a disk having an orifice therethrough, or even two or more intersecting plates, e.g., forming a "V". The sharp-edged orifice is most preferably substantially concentric with the internal cross-section of the pipe, the central opening having an area preferably of from about 90 to about 50% of the pipe internal cross-sectional area. The planar shape of the thin plate is not of major significance.

The thin plate preferably has a thickness, i.e., the dimension parallel to the direction of flow through the pipe, at least an order of magnitude smaller than either transverse dimension of a major baffle surface of the thin plate, i.e., facing towards or away from the direction of flow. Generally, the thinner the plates, the sharper the edge. However, a sharp edge can be formed from a relatively thick plate, to insure rigidity, by beveling the edge surface, preferably on the major surface facing away from the direction of flow.

The internal diameters of the pipes into which these sharp-edged plates are placed are sized in accordance with the desired fluid flow. Most commonly available sizes are in the range of from about 1 inch to about 12 inches. Larger or smaller sizes are available for special purposes. At too small a pipe diameter, so-called capillary forces, based upon the surface tension of the liquid relative to the pipe inner wall material become more significant.

The various features and advantages of the present invention will become more apparent from the accompanying drawings and the following verbal descriptions of preferred embodiments of the present invention. The descriptions and drawings, and the following examples, are given merely to show preferred examples of the present invention are not intended to be exclusive of the scope thereof.

Referring to the drawings.

Figure 1:
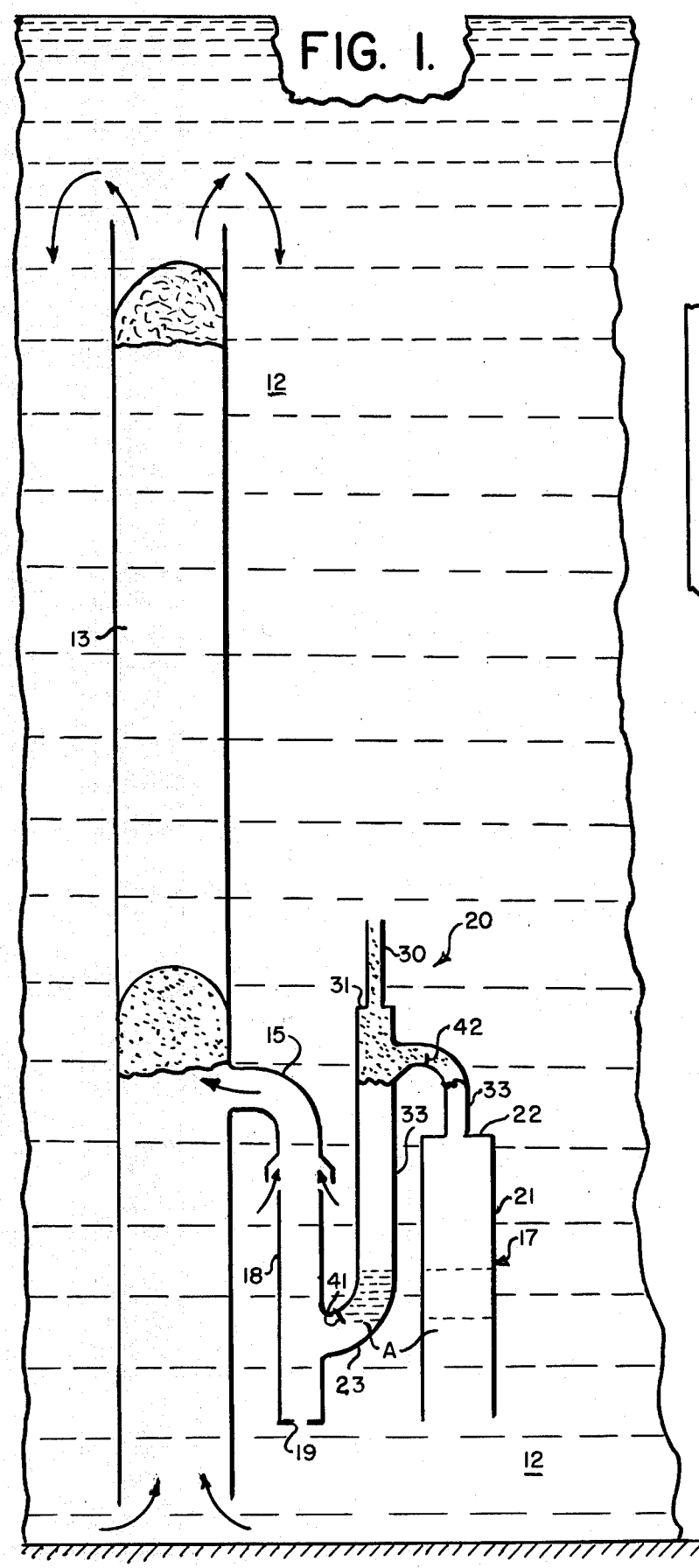
FIG. 1 is a diagrammatic elevation sketch of a preferred large bubble generator and accompanying standpipe and stackpipe.

Referring to FIG. 1, a preferred embodiment of the present invention is shown, by way of example, as being completely submerged in a body of a liquid 12, such as a chemical mixing tank or the like, and comprises an open-ended vertical conduit or stack 13, supported within the body of liquid. The open lower end, of the stackpipe can either be supported on a stand extending upward from the floor beneath the body of liquid, or by other means not shown. A side pipe 15, forming a T with the peripheral surface of the stackpipe 13 extends outwardly from the stack 13 ending in a flared, frusto-conical opening, pointing substantially downwardly. The frusto-conical inlet is downwardly, outwardly flared. A standpipe 18 is supported within the body of liquid, its open upper end centered within the flared opening of T-pipe 15, but vertically located slightly below, there being an annular opening between the end of standpipe 18 and the flared end of T-pipe 15. The lower end of standpipe 18 has a restricted orifice opening defined by lower plate 19. The plate 19 is sealed around its outer edges to the peripheral surface of pipe 18.

The "large-bubble" generator, generally indicated by numeral 20, is disposed generally adjacent to the standpipe 18 and stackpipe 13, also submerged within the standing body of liquid. The "large-bubble" generator comprises a circular cylindrical gas accumulator tank, generally indicated by the numeral 17, having a flat circular top wall 22, and a depending cylindrical peripheral wall 21. The peripheral wall 21 defines a completely open bottom, open to the body of liquid.

A gas inlet 30 enters through a flat plate 31 above an extended portion of a bent, curved pipe 33. The bent, curved pipe 33 is connected to the flat top wall 22 of the gas accumulator tank 27. The other end of the bent pipe 33 connects through the peripheral wall of the standpipe 18.

In the operation of the large bubble generator embodiment described above, a gas is delivered to the gas accumulator tank 20 through the gas inlet pipe 30. The gas, which is under pressure, enters the accumulator tank 20, lowering the water level therein, and simultaneously lowering the water level within the bent pipe 33. As soon as the water level within the accumulator tank 20 reaches below the level of the upper edge of the second bend 23 in pipe 33, the level indicated by the letter A in FIG. 1, all of the gas within tank 20 and leg 33 is rapidly siphoned out through leg 33 into the standpipe 18 as a single large bubble. The large bubble rises upwardly through the standpipe 18, entering the flared opening of transverse pipe 15 and then into the stackpipe 13. The single large bubble expands to take up the entire cross-section of stackpipe 13, thus serving to raise all of the liquid within the pipe above the bubble. As the large bubble pushes the water out the top of the stackpipe in front of it, additional liquid is brought into the stackpipe through its bottom opening. As shown in the diagram of FIG. 1, by the arrows, a circulation through the standing body of liquid is thus obtained. As the bubble moves upwardly through the stackpipe 13, the bubble generating cycle is repeated, within the gas generator, as the gas inlet continues to supply additional gas into the gas generator accumulator tank 21. In the preferred embodiment of this operation, a second gas bubble is generated up through the standpipe 18 before the preceding large gas bubble is ejected from the upper end of the stackpipe 13.

In addition to the liquid brought into the stackpipe through the open bottom thereof, a small percentage of liquid is also drawn in through the annular opening between the flared traverse end of the side pipe 15 and the standpipe 18.

The construction and operation of large bubble generators of this type is set forth in greater detail in copending application Ser. No. 54,826, filed July 5, 1979. Other types are shown in U.S. Pat. Nos. 3,592,450, 4,169,873 and 4,187,263, for example.

Most efficient operation of a large bubble generator for mixing of a standing body of liquid requires generating the large bubbles at a rapid rate. In order to accomplish this without "motoring", there must be a sharp cut-off of gas and liquid flow from the gas generator system, i.e., the accumulator tank 20 and bent pipe 33, into the standpipe 18, as soon as the large bubble passes beyond level "A". The space behind the bubble must fill up with liquid, and that liquid must be gradually replaced by gas until the entire volume down to level "A" in the gas-accumulator system is filled with gas, that is again released as a single "large bubble". This sharp cut-off of liquid flow does not occur during motoring; the presence of a long chain molecule in the system interferes with the desirable sharp cut-off. The effect of such a long chain molecule is to reduce the ultimate rate of large bubble generation before motoring begins in a given system.

The presence of the sharp-edged baffle plates, 41, 42, at the bends in the pipe 33, tends to counteract the tendency of the long chain molecules to prevent the desired sharp cut-off.

Figure 2:
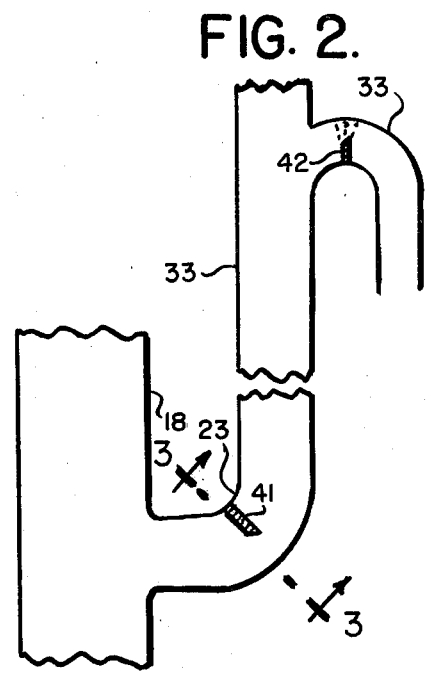
FIG. 2 is an enlarged side elevation sketch of a portion of the large bubble generator and accompanying standpipe of FIG. 1.
Figure 3:
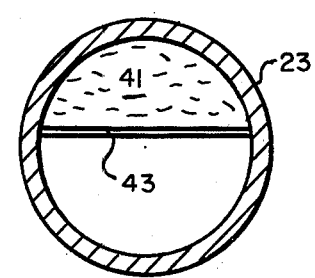
FIG. 3 is an enlarged cross-section taken along lines 3—3 of FIG. 2.
Figure 4:
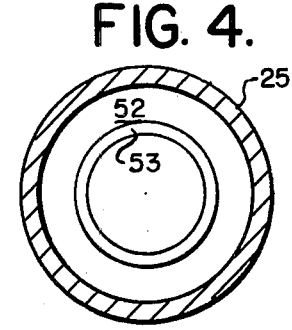
FIG. 4 is an equivalent view to FIG. 3, but showing an alternative sharp-edged plate.
Figure 5:
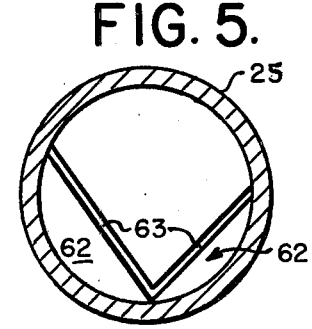
FIG. 5 is an equivalent view to FIG. 3, but showing another alternative sharp-edged plate.

FIGS. 3, 4 and 5 are views showing alternative embodiments of the sharp-edged thin plate in accordance with the present invention. FIG. 3 is a cross-sectional view taken from FIG. 2 showing a single plate 41 blocking the inner portion of the pipe bend 23, i.e., extending downwardly as shown in FIG. 2. The plate extends approximately along a pipe diameter extending from the inner apex of bend 23, blocking approximately 40% of the pipe cross-section at that location. The plate 41 as shown has a plan surface shape of a portion of a circular disk, the outer circumference being an arc of a circle cut by the chord formed by the sharp edge 43. The sharp edge 43 is beveled on the downstream side of the plate, i.e., the surface closest to the standpipe 18. The beveling provides a sharper edge, while permitting the plate to be sufficiently thick so as to have the desired rigidity in the face of even a fast moving stream of fluid, i.e., to prevent buckling or warping of the flat baffle surface of the plate 41. As stated above, a bevel is not necessary, but it does result in improved performance.

Referring to FIG. 4, the sharp-edged plate is shown as a disk 52 having a substantially concentric orifice formed therethrough; the baffle surface of the disk blocks approximately 20% of the interior pipe cross-section. The inner circumference of this disk is also beveled at the edge 53, on the downstream face of plate 52.

Referring to FIG. 5, a pair of intersecting sharp-edged plates 62 are shown in place, the intersecting "V" being substantially at the inner apex of the pipe bend, and each of the plates 62 being beveled at the edge 63, as explained above. The two plates together cut off approximately 30% of the total interior cross-section of the pipe 33 at the bend 23.

Each of the beveled plates shown in FIGS. 3 through 5, are located at the apex of the bend 23 of the pipe 33. Each plate is in this case formed of a hard rigid material, such as stainless steel. Any other hard rigid materials, which are preferably inert to the liquid being passed through the pipe, can also be utilized. The same type of disk or plate, or an alternative type, can be used in place of plate 42 at the upstream bend of the inverted siphon formed with the connecting pipe 33. As explained above, a plate of this type can be located only at one of these bends; but if so, the plate is preferably located in the downstream position of plate 41 shown in the drawing of FIG. 2, but even more preferably the plates are located at both of the locations 41 and 42.

The presence of these plates is especially useful when treating fluids which are themselves formed of long-chain molecules, or of liquids which have dissolved within them such long-chain molecules. These materials do have a highly viscous consistency, although viscosity per se is not the determining measurement for requiring this type of a construction in the inverted siphon, in order to provide the sharp cut off necessary to insure the generation of a succession of large bubbles, rather than a continuing flow of relatively small bubbles. The liquid would be considered a non-Newtonian liquid, including the type known as a "visco-elastic fluid". Examples of such materials include aqueous solutions of Polyox, i.e., ethylene oxide polymers, having a molecular weight of at least about 100,000. A similar effect is obtained with a silicon putty, derived from the polymerization of dimethyl silicon oil. Such material is commercially sold under the Trademark SILLY PUTTY. Cellulose derivatives, such as are found in the manufacture of rayon, or when using agents such as carboxymethylcellulose, also can provide the same effect. At times, solutions of, for example, gelatin, condensed milk, certain types of honey, the thick portion of egg white, and various oils, can also demonstrate the tendency to continue to flow through the tube, unless a sharp-edge plate is placed in the above-defined locations.

The following examples further provide descriptions of a preferred embodiment of the present invention.

EXAMPLE I

In a mixing tank, having a total capacity of 200 gallons, with a liquid height of about 4 feet, a stackpipe approximately 3.0 ft. long is provided, the lower end being supported approximately 4.5 in. above the floor of the tank, the upper end approximately 0.75 ft. below the top surface of the liquid. The stackpipe has an internal diameter of 6 inches. A transverse T-pipe connects into the stackpipe at a location of about 1.75 ft. below the open top end of the stackpipe. The T-pipe has an internal diameter of about 4 inches; however, the open end flares out to a diameter at its inlet end of approximately 5 inches in internal diameter, the opening pointing substantially straight downwardly, as shown in FIG. 1. A standpipe having an open top end facing into and substantially just below the level of the bottom of the flared inlet to the transverse pipe has an internal diameter of 2½ in. A bent pipe 23 has the same internal diameter, 2½ in., and the gas accumulator tank has an internal diameter of about 2½ inches. Level A in FIG. 1 is located approximately 7.5 inches below the top 22 of the accumulator tank 20. The opening at the bottom of the standpipe 18 has a diameter of approximately 1 inch; gas is supplied through inlet tube 25 at 2.0 psi gauge at a rate of approximately 5.0 cubic feet per minute, measured at gauge pressure.

The liquid in the tank is an aqueous solution of 0.8% WSR 301 Polyox, having a molecular weight of 4,000,000 and a viscosity of 900 cps at 25° C. In this circumstance, a large gas bubble cannot be generated at this level of air flow, but rather a series of small bubbles continues to be generated and the desired mixing effect is not obtained. When the gas flow is reduced to a rate of approximately 3.33 cubic feet per minute, large gas bubbles begin to be generated every 1.02 seconds.

The identical equipment is utilized; however, a sharp-edge plate, the type shown in FIG. 2 and FIG. 3, is inserted at the locations indicated for plates 41 and 42 in FIG. 2. A large gas bubble is thus generated at the initial gas flow rate of 5.0 cubic feet per minute at 2.0 psi gauge, without any difficulty. The plates 41 and 42, each cut off, or baffle, approximately 35% of the total cross-sectional area of the pipe bend at each location. The plates are each ⅛ inch thick, and have a bevel at their outer edge. When a disk is used at either of the locations 41 and 42, of the type shown in FIG. 4, the diameter of the sharp-edged orifice therethrough is 2 inches, in this Example.

The patentable embodiments of this invention which are claimed are as follows:

1. In a device for creating circulation within a body of liquid, the liquid including long-chain molecules, the device comprising a substantially vertically extending stackpipe means designed to be wholly submerged within the liquid, the stackpipe having an upper discharge opening and a lower inlet opening; a large bubble generator means, also designed to be wholly submerged within the liquid, and for delivering bubbles to said stackpipe, the generator means comprising a gas accumulating chamber having an opening in the lower part thereof, and curved piping, defining a siphon, connecting the gas accumulator chamber to the stackpipe, and means for delivering gas under pressure into the accumulator chamber; the improvement comprising:

the presence of a sharp-edged baffle plate at a bend in the pipe between the gas accumulator chamber and the stackpipe, the sharp-edged baffle plate extending from the inner portion of the curve in the bent pipe towards the centerline of the pipe, so as to block at least about 10% of the cross-sectional flow area of the pipe.

2. The device of claim 1 wherein the sharp edge of the baffle forms a substantially straight line chord of the inner circumference of the pipe.

3. The apparatus of claim 2, wherein the baffle plate blocks not more than about 50% of the flow area.

4. The apparatus of claim 1, wherein the baffle plate is in the shape of an annular disk, the sharp edge forming a substantially central opening and wherein the baffle plate blocks at least about 10% but not more than about 50% of the flow area of the pipe cross-section.

5. The apparatus of claim 4, wherein the central opening is circular and substantially concentric to the interior cross-section of the pipe.

6. The device of claim 1, wherein the sharp edge defines a series of intersecting substantially straight lines, the intersection being located substantially at the inner apex of the curve of the bent pipe.

7. The device of claim 1 or 2 or 4, wherein the baffle plate is beveled at its edge on the downstream surface of the plate.

8. A large bubble generator designed to be connected to a substantially vertically extending pipe and to be wholly submerged within a liquid, the large bubble generator comprising a gas accumulator chamber designed to be connected to a source of gas pressure, and an inverted siphon comprising a pipe having a series of bends therein, one end of the siphon being connected to the upper portion of the gas accumulator chamber, the second end designed to be connected to a substantially vertically extending pipe; the improvement comprising:

a sharp-edged baffle plate secured to the internal circumference of the pipe substantially at the interior apex of a bend in the inverted siphon pipe, the baffle plate blocking at least about 10% of the cross-sectional flow area of the pipe.

9. The large bubble gas generator of claim 8, comprising a sharp-edged baffle plate at each bend in the siphon pipe.

* * * * *